May 4, 1943.  R. A. KASSEL  2,318,497
PLEATED MATERIAL AND METHOD OF MAKING THE SAME
Filed Sept. 25, 1941  2 Sheets-Sheet 1
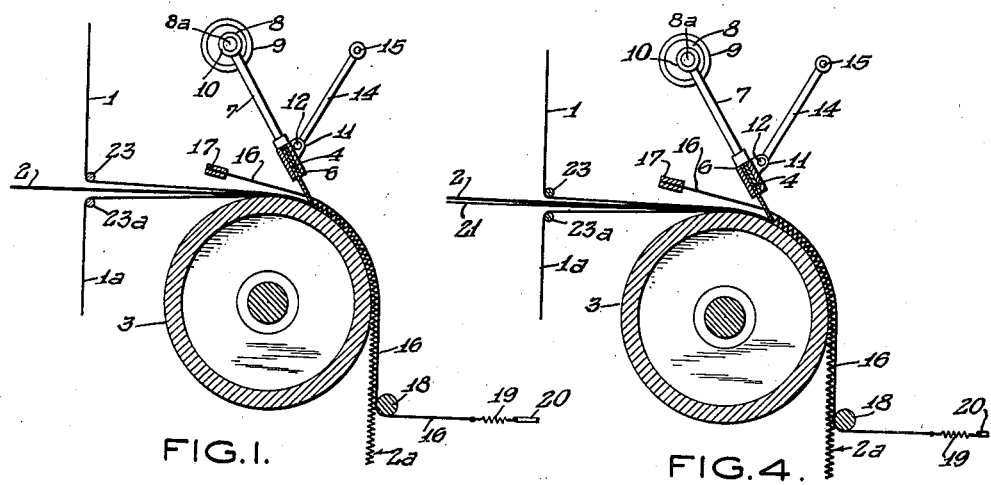
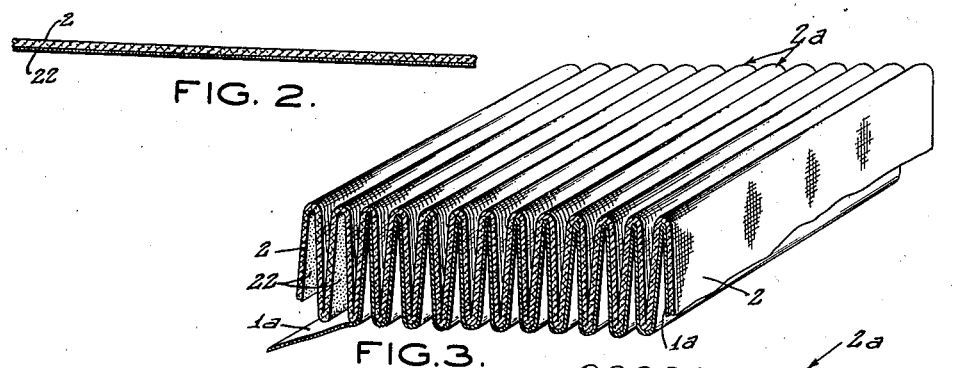
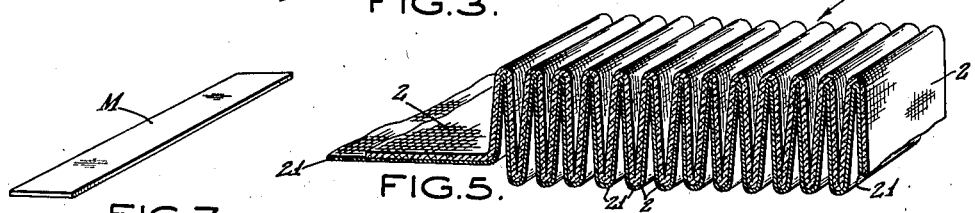
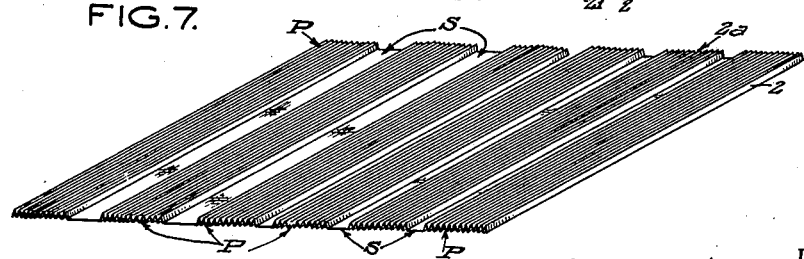
INVENTOR.
BY Robert A. Kassel
Mock & Blum
ATTORNEYS

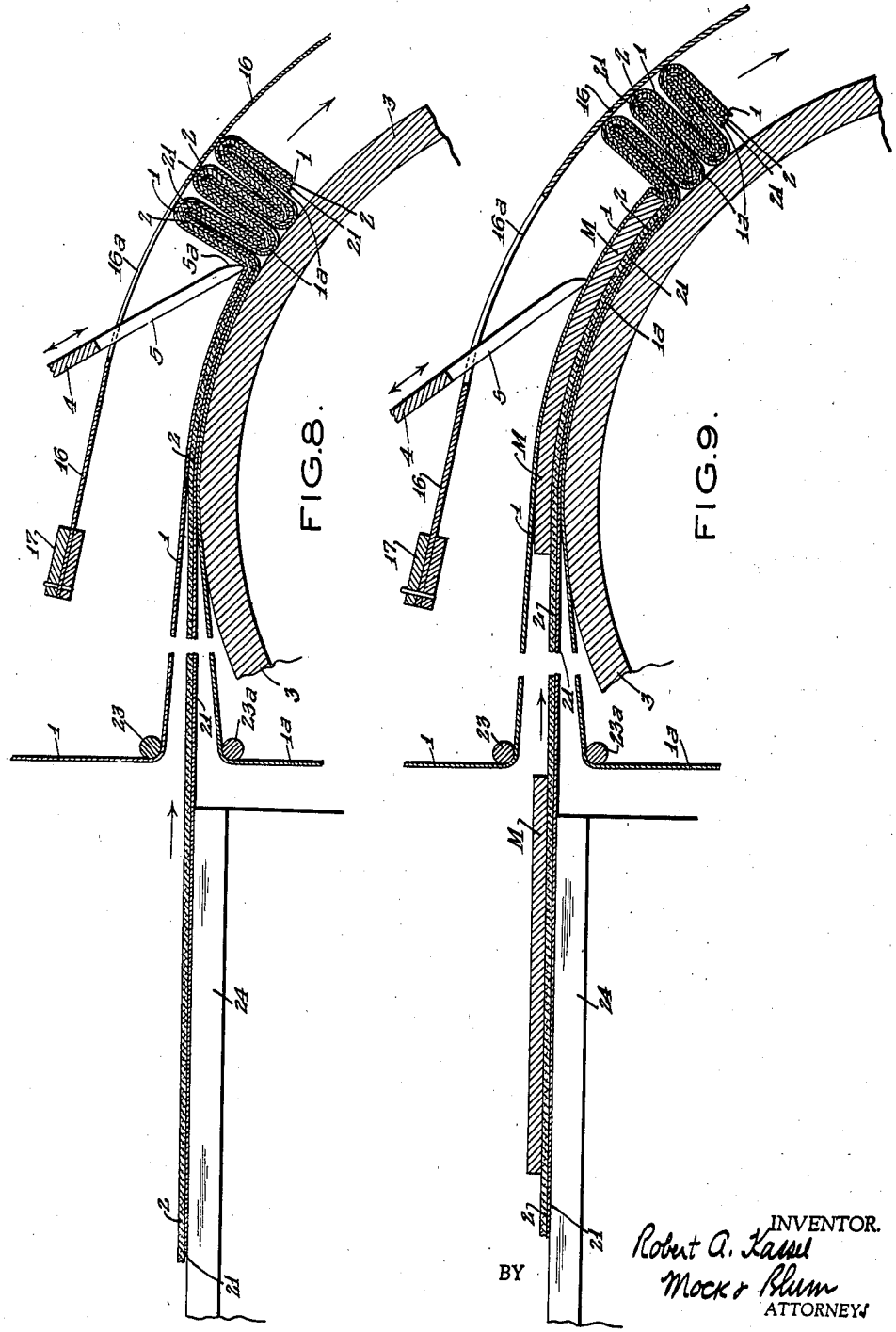

Patented May 4, 1943

2,318,497

UNITED STATES PATENT OFFICE 2,318,497

PLAITED MATERIAL AND METHOD OF MAKING THE SAME

Robert A. Kassel, Brooklyn, N. Y., assignor to Charles I. Rockmore, Inc., Brooklyn, N. Y., a corporation of New York Application September 25, 1941, Serial No. 412,307

2 Claims. (Cl. 154—33.05)

My invention relates to a new and improved plaited material, and to a new and improved method of making the same.

The material which is to be plaited may be elastic or non-elastic. For example, the material which is to be plaited may be an elastic or rubberized cloth, leather and the like. The material may be stretchable without being elastic.

One of the objects of the invention is to provide a plaited material having plaited sections which are separated from each other by unplaited sections. The plaits extend preferably across the entire width of the material, and the plaited sections are separated longitudinally from each other, in any desired spacing or pattern.

Another object of the invention is to connect the rear or inner side of the material to a thin backing layer of adhesive, which may be elastic and vulcanized rubber, prior to the commencement of the plaiting operation, or during the plaiting operation, so that the backed sheet of material will have no exposed layer of adhesive.

Another object of the invention is to utilize and operate a plaiting machine of well-known construction, and to provide unplaited areas by feeding suitable masks into the machine.

Other objects of the invention will be stated in the annexed description and drawings, which illustrate a preferred embodiment thereof.

Fig. 1 is a diagrammatic elevation, partially in cross-section, showing the standard operations in the present type of plaiting machine.

Fig. 2 is a cross-section of the coated cloth which is passed through the standard plaiting machine, according to present standard practice.

Fig. 3 is a diagrammatic perspective view illustrating the continuous formation of plaits in the standard coated cloth which is passed through the standard plaiting machine, according to present standard practice.

Fig. 4 is a view similar to Fig. 1, illustrating how a backing or reinforcing layer is fed into the plaiting machine, simultaneously with the main or face material, according to the invention.

Fig. 5 illustrates the formation of the plaits, with the use of the reinforced material, according to the invention.

Fig. 6 is a perspective view of the new material, showing the unplaited areas between the plaited areas.

Fig. 7 is a perspective view of one of the masks which are used in carrying out the invention.

Fig. 8 is an enlarged diagrammatic vertical sectional view, partially in elevation, illustrating the formation of the plaits according to the improved method.

Fig. 9 is similar to Fig. 8, save that Fig. 9 shows the action of a mask which produces an unplaited area between consecutive plaited areas.

As known for many years, the standard plaiting machine consists of a stationary drum, around whose surface the material is simultaneously fed and plaited by means of a plaiting knife whose free edge has separated points. It has been attempted for many years to make a plaited fabric in which the plaited areas were separated by unplaited areas. In such attempts, it has been proposed to turn the drum intermittently, when unplaited areas were desired, so that the surface of the drum would move in unison with and much more rapidly than the corresponding movement of the plaiting knife, so that the material would be fed without plaiting the same. In order to carry out such proposals, it was necessary to introduce complicated parts and movements and such attempts have hitherto proved absolutely unsuccessful.

According to my improved method, the conventional stationary drum of the plaiting machine is held stationary, and the plaiting action of the plaiting knife is interrupted at spaced intervals by the use of masks, thus permitting the plaiting knife to perform its usual function of feeding the fabric, but without plaiting the material, at desired areas.

Referring to Fig. 1, this diagrammatically shows how a sheet of cloth 2 is fed towards the stationary and heated drum 3, while sheets of paper 1 and 1a, which are led around guide rolls 23 and 23a, are simultaneously fed towards said drum 3. At the stationary drum 3, the sheet of cloth 2 is located intermediate the sheets of paper 1 and 1a. The widths of the sheets of paper 1 and 1a, and of the sheet of cloth 2, are identical. A flexible band 16, which is made of steel or any other suitable material, has one end thereof detachably fixed to the clamp 17, which is fixed in any suitable manner to the frame of the machine. The other end of the band 16 is led around the guide roll 18, and said other end of the band 16 is anchored by a tension spring 19 to an adjustable clamp 20, which is fixed to the frame of the machine in any suitable manner.

It is standard practice to provide a number of slightly spaced steel bands 16, which extend across the entire width of the material, save for the spaces between adjacent bands 16. It is also standard practice to provide such bands with longitudinally slotted portions 16a. The material of each band 16 is cut out at each slotted portion 16a, in order to form longitudinal slots or spaces of equal width. These longitudinal slots are separated by intermediate longitudinal teeth or partitions. These teeth or partitions are of equal width. The width of each tooth or partition is less than the width of a slot. The longitudinal edges of adjacent bands 16 are separated from each other by a distance which is equal to the width of a longitudinal slot. These details are not shown in the drawings, as they are conventional and well known.

The plaiting knife 4 is made of steel or other suitable material and said plaiting knife is detachably fixed to a clamp 6. At its free edge, namely, adjacent the drum 3, a number of teeth are provided so that these teeth can enter the longitudinal slots of all the bands 16. One of these teeth 5 is shown in Fig. 8, and also in Fig. 9.

The clamp 6 is fixed to a pair of rods 7 which are pivoted to and which are reciprocated by means of crank-pins 8a, which are fixed to plates 8 which are fixed to a shaft whose axis of rotation is defined by point 10. Said axis of rotation is horizontal. The clamp 6 has a lug 11 which is pivotally connected at 12 to a link 14, which is pivotally mounted at 15. The link 14 is thus mounted for oscillation around the pivot 15. The plaiting knife 4 is therefore operated in a conventional manner, to contact with the material and to plait the material during the downstroke of said plaiting knife. At the end of said downstroke, the teeth 5 are slightly separated from the material so that the tips of the teeth 5 do not contact with the material during the upstroke of the plaiting knife 4. The tips of the teeth 5 are convex at 5a, in order to provide said teeth with sharp points. The plaiting knife and its teeth are also of conventional construction.

The use of the sheets of paper 1 and 1a is also conventional, in order to facilitate the guiding and plaiting of the cloth. In addition, the sheet of paper 1 prevents the cloth from being injured by the points of the teeth 5.

According to the standard practice, the sheet of cloth 2 was provided at its underside with a layer of rubber cement or other adhesive 22. Therefore, while it was quite easy to strip the layer of paper 1 from the cloth 2, after the plaiting operation had been completed, it was difficult to remove the sheet of paper 1a from the cloth 2, and the removal of the sheet of paper 1a from the plaits, distorted and weakened the plaits.

The purpose of providing the sheet of cloth 2 with a layer of rubber cement or the like, was to strengthen the plaits and to prevent the same from being easily straightened. If the layer 22 was a rubber cement, this was vulcanized by the heated drum 3, thus providing the sheet of cloth 2 with an inner layer of thin vulcanized rubber.

According to the improved method, and as shown in Fig. 4, a sheet of backing cloth 21 is fed into the machine simultaneously with the main or outer sheet of cloth 2. The surface of the main sheet of cloth 2, which faces the reinforcing layer 21, is provided with a layer of rubber cement or the like. This layer of rubber cement or the like is not shown in Fig. 4 or in various other figures, since the showing thereof in Fig. 2 is sufficient.

The exposed side of the backing material 21 is free from any adhesive. Therefore, after the plaiting operation has been completed, thus producing the construction which is shown in Fig. 5, it is very easy to strip the paper 1 and the paper 1a from the plaited material, without deforming or injuring the plaits. The backing material 21 is extremely thin, and preferably much thinner than the material 2.

Fig. 7 shows a mask M which is made of flexible cardboard or fibre board or of any material which will stand up under the action of the teeth of the plaiting knife.

As shown in Fig. 8, the machine is provided with a table 24 on which the sheet 2 of main material and the sheet 21 of reinforcing material may be placed. When these sheets of material 2 and 21 are fed into the machine, they are not connected by the intermediate layer of adhesive, because said intermediate layer is then preferably dry and substantially non-adherent. The adhesion is secured simultaneously with the plaiting, by the action of the heated drum 3, which softens the layer of adhesive and produces its binding action.

The sheets or layers 2 and 21 may be made of any material or materials, although they are preferably woven fabrics whose filler threads are parallel to the width of the material. In addition to using rubber for uniting the face material and the backing material, I can use any other suitable thermoplastic or non-thermoplastic binding material. Numerous thermoplastic resins are well known, which can be softened under heat or under the combined action of heat and pressure, in order to unite two layers of cloth or other material. The intermediate bonding layer may be elastic or non-elastic although it is preferably sufficiently yieldable so that it will not crack if the plaits are temporarily distorted.

The adhesive may be a latex adhesive or a rubber adhesive of any suitable known composition, which contains a vulcanizing ingredient, accelerators, etc., so that the adhesive is changed into elastic vulcanized rubber at the drum, during or prior to the commencement of the plaiting operation. The adhesive may be wholly or partially pre-vulcanized, and dried by the heat of the drum.

The adhesive is fully set into its final condition, as the material is moved out of the plaiting zone at the drum.

The standard machine which is diagrammatically shown, is thus operated without any change in its mechanical movements, and the control which is the basis of the improved method, depends upon the material which is fed into said standard machine and the use of the masks M.

The adhesive is preferably sufficiently softened or set to unite the layers 2 and 21, prior to the commencement of the plaiting operation, so that said layers are plaited without separation.

The operator places the masks M on the upper side of the sheet of material 2, at any desired spaced intervals, which may be indicated by suitable markings on the upper surface of the sheet of material 2. The separated masks M are thus fed into the machine, between the sheet of paper 1 and the sheet of material 2.

The material of the mask M is sufficiently firm to prevent the respective part of the sheets 2 and 21 from being plaited.

Therefore, and as shown in Fig. 6, unplaited areas S are formed between plaited areas P. The plaited areas P and S extend respectively across the entire width of the connected sheets of material 2 and 21 and said plaited and unplaited areas are spaced in a direction parallel to the length of the material.

When the operation of this machine is started, the bands 16 are in tight contact with respective parts of the periphery of the fixed drum 3, due to the action of the respective tension springs 19. The teeth 5 of the plaiting knife feed the material with a series of intermittent strokes. Since the drum 3 is stationary and since the tensioned strips 16 resist the forward feed of the material, the plaiting knife serves both to feed the material forwardly and also to plait the same.

When the tips of the teeth of the plaiting knife strike the mask M, the forward feeding motion is maintained, and said forward feeding action is even accelerated because the forward movement of the material is not taken up by the formation of plaits.

The plaiting knife therefore acts merely as a feeding member when a respective mask M is in its operative position under the teeth of the plaiting knife.

The areas S of the improved material, which are shown in Fig. 6, may be decorated by stitching strips of leather or other ornamental material thereto, or by connecting said strips of ornamental material by means of adhesive to said areas S.

As the plaited composite material 2a comes out of the machine, the masks M drop off freely, or else they can be very easily removed. The exposed surface of the main sheet of material 2, at the areas S, can be printed or otherwise decorated.

The material shown in Fig. 6 is valuable for making shoes and for numerous other decorative purposes.

The spacing between respective plaited areas P may be uniform or it may be varied in order to get various ornamental effects.

As the material is plaited, the plaits force the flexible and resilient bands 16 away from the periphery of the drum S, against the force of the tension springs 19. The areas S may be of any length, which may be less than, or equal to, or greater than the width of the material which is being plaited. The length of a non-plaited and flat area S is preferably less than the width of the fabric. Ordinarily, during the operation of the machine according to my improved method, there will always be some plaits between the bands 16 and the periphery of the drum, but the length of an unplaited area S may be equal to, or even exceed, the length of the arc of contact between the bands 16 and the drum, if there are no plaits at the inner sides of bands 16.

Hence, during the operation of the machine, the bands 16 may make maximum contact with the drum, or less than said maximum contact.

I have described a preferred embodiment of the invention, but it is clear that it covers several valuable steps in the art, as well as a complete combination, and that numerous changes and omissions can be made without departing from the invention.

The plaiting knife is made sufficiently long and springy so that it bends when its teeth strike a mask M. Therefore, the teeth of the plaiting knife do not penetrate the mask M, but the friction between said teeth and the mask is sufficient to feed the mask. The knife thus feeds the sheet of paper 1 and the mask M and the sheets 2 and 21, and the sheet of paper 1a, relative to the drum 3, which may be designated as a material-supporting member. The invention is not limited to maintaining the material-supporting member 3 stationary, although this is preferred. It is sufficient if the plaiting member feeds the material in one layer, or in a plurality of layers, relative to member 3.

It will be noted that according to my method, the plaits of the material which come out of the machine are free from adhesive at the exposed faces or sides of said plaits 1 and that the connecting adhesive between layers 2 and 21 is preferably elastic and set to final plait form before the material leaves the machine.

I claim:

1. A method of plaiting material so as to form plaits therein in plaited areas which are separated by unplaited areas, which consists in feeding the material relative to a material-supporting member and with an inner face of the material in contact with a part of said material-supporting member and the outer face of the material free from contact with said material-supporting member, thus feeding the material by a series of intermittent feeding strokes of a combination feeding and plaiting member which intemittently contacts with said outer face, locating a mask between said outer face and the operating end of said plaiting member to prevent said plaiting member from plaiting the respective part of said material, moving said mask in unison with said material during said intermittent feeding strokes, and striking said operating end against the outer face of said mask while said mask is located in the path of movement of said outer end.

2. A method according to claim 1, in which said material-supporting member is held stationary during said plaiting operation, and including the step of holding the material supporting member stationary during said plaiting operation.

ROBERT A. KASSEL.